United States Patent Office.

ICHABOD W. DAWSON, OF NEWARK, NEW JERSEY.

Letters Patent No. 70,176, dated October 29, 1867.

IMPROVEMENT IN THE MANUFACTURE OF ENAMELLED AND JAPANNED LEATHER.

*The Schedule referred to in these Letters Patent and making part of the same.*

TO ALL WHOM IT MAY CONCERN:

Be it known that I, ICHABOD W. DAWSON, of Newark, county of Essex, and State of New Jersey, have made certain new and useful Improvement in the Manufacture of Enamelled and Japanned Leather; and I do hereby declare the following to be such a full and exact description thereof as will enable others skilled in the art to put the same in practice.

The object of my invention is to produce an enamelled or japanned leather that will not, by subsequent wear or use, stretch to such a degree as heretofore, and cause the finished surface of the same to crack. This I accomplish by subjecting the leather, before the japan or composition is applied, to a powerful stretching action, and drying the same while thus distended. This leaves the leather extended to its utmost, and with its surface, owing to the expansion of the hide and its pores being more open, in a better condition to receive and retain the japan or composition, and the leather, the japan or composition on which is applied after the leather has been powerfully stretched, is quite effectually prevented from cracking by any subsequent use or wear.

Japan or composition has been applied heretofore to leather in its unstretched state.

What I claim as of my invention, and desire to secure by Letters Patent, is—

Leather, the japan or composition of which is applied after the same has been subjected to a powerful stretching action, as a new article of manufacture.

ICHABOD W. DAWSON.

Witnesses:
JACOB H. DAWSON, Jr.,
JNO. R. ELLIOTT.